(12) United States Patent
Mays et al.

(10) Patent No.: US 11,535,514 B2
(45) Date of Patent: Dec. 27, 2022

(54) SYSTEM AND METHOD FOR RECYCLING PRESSURE SWING ABSORBER OFF-GAS

(71) Applicant: GAS TECHNOLOGY INSTITUTE, Des Plaines, IL (US)

(72) Inventors: Jeffrey A. Mays, Woodland Hills, CA (US); Megan Herrera, Sherman Oaks, CA (US)

(73) Assignee: GAS TECHNOLOGY INSTITUTE, Des Plaines, IL (US)

( * ) Notice: Subject to any disclaimer, the term of this patent is extended or adjusted under 35 U.S.C. 154(b) by 30 days.

(21) Appl. No.: 17/182,867

(22) Filed: Feb. 23, 2021

(65) Prior Publication Data
US 2021/0261409 A1 Aug. 26, 2021

Related U.S. Application Data

(60) Provisional application No. 62/981,743, filed on Feb. 26, 2020.

(51) Int. Cl.
| | | |
|---|---|---|
| *B01D 53/04* | (2006.01) | |
| *B01D 53/047* | (2006.01) | |
| *B01D 53/22* | (2006.01) | |
| *B01D 53/62* | (2006.01) | |
| *B01D 53/83* | (2006.01) | |
| *B01D 53/96* | (2006.01) | |
| *B01J 8/18* | (2006.01) | |
| *C01B 3/44* | (2006.01) | |
| *C01B 3/50* | (2006.01) | |
| *C01B 3/56* | (2006.01) | |

(52) U.S. Cl.
CPC .............. *C01B 3/56* (2013.01); *B01D 53/047* (2013.01); *B01D 53/0438* (2013.01); *B01D 53/229* (2013.01); *B01D 53/62* (2013.01); *B01D 53/83* (2013.01); *B01D 53/96* (2013.01); *B01J 8/1827* (2013.01); *C01B 3/44* (2013.01); *C01B 3/501* (2013.01); *B01D 2257/108* (2013.01); *B01D 2257/504* (2013.01); *B01D 2258/02* (2013.01); *C01B 2203/0233* (2013.01); *C01B 2203/042* (2013.01); *C01B 2203/0405* (2013.01); *C01B 2203/1241* (2013.01); *C01B 2203/148* (2013.01)

(58) Field of Classification Search
CPC .... B01D 53/96; B01D 53/0438; B01D 53/06; B01D 53/83; B01D 53/62; B01D 53/047; B01D 2257/504; B01D 53/229; B01D 2257/108; B01D 2258/02; C01B 2203/0405; C01B 2203/0438; C01B 2203/1258; C01B 2203/148; C01B 2203/1241; C01B 3/501; C01B 2203/043; C01B 3/44; C01B 3/56; C01B 2203/042; C01B 2203/0894; C01B 2203/0233; Y02C 20/40; B01J 8/1827; B01J 8/24; Y02P 20/151

See application file for complete search history.

(56) References Cited

U.S. PATENT DOCUMENTS

| | | | |
|---|---|---|---|
| 5,326,550 A | 7/1994 | Adris et al. | |
| 5,753,010 A | 5/1998 | Sircar et al. | |
| 6,503,299 B2 | 1/2003 | Baksh et al. | |
| 2004/0179998 A1* | 9/2004 | Gittleman | C01B 3/56 48/128 |
| 2008/0072752 A1* | 3/2008 | Kumar | B01D 53/0476 95/103 |
| 2008/0145309 A1 | 6/2008 | Bavarian et al. | |
| 2010/0056648 A1* | 3/2010 | Schroer | C01B 3/384 518/703 |
| 2010/0288123 A1* | 11/2010 | Chen | C01B 3/56 95/93 |
| 2011/0147270 A1 | 6/2011 | Goldstein et al. | |
| 2012/0141367 A1* | 6/2012 | Wynn | C01B 3/382 423/652 |
| 2021/0163287 A1* | 6/2021 | Song | C01B 3/56 |

FOREIGN PATENT DOCUMENTS

| | | | | |
|---|---|---|---|---|
| CA | 2 685 705 A1 * | 5/2010 | ......... | B01D 53/1487 |
| JP | 2016-175818 | 10/2016 | | |

OTHER PUBLICATIONS

U.S. Patent Office, English language version of the International Search Report, Form PCT/ISA/210 for International Application PCT/US2021/019808, dated May 6, 2021 (3 pages).
U.S. Patent Office, English language version of the Written Opinion of the ISA, Form PCT/ISA/237 for International Application PCT/US2021/019808, dated May 6, 2021 (6 pages).

* cited by examiner

*Primary Examiner* — Timothy C Vanoy
(74) *Attorney, Agent, or Firm* — Pauley Erickson & Swanson

(57) ABSTRACT

A method and system for an enhanced reforming process employing a pressure swing absorber. An off-gas from the pressure swing absorber is divided with a first portion sent back into a reforming reactor and a second portion sent to a heat generator for the reforming process. The first off-gas portion from the pressure swing absorber can be pressurized by a compressor and reintroduced into a fluidized bed reactor.

20 Claims, 3 Drawing Sheets

SYSTEM AND METHOD FOR RECYCLING PRESSURE SWING ABSORBER OFF-GAS

CROSS REFERENCE TO RELATED APPLICATION(S)

This application claims the benefit of U.S. Provisional Application Ser. No. 62/981,743, filed on 26 Feb. 2020. The provisional application is hereby incorporated by reference herein in its entirety and is made a part hereof, including but not limited to those portions which specifically appear hereinafter.

BACKGROUND OF THE INVENTION

Field of the Invention

The invention relates generally to pressure swing absorption and, more particularly, to methods and systems involving recycling of pressure swing absorber off-gas.

Discussion of Related Art

Pressure swing absorption (PSA) is a processing technique, such as used in conjunction with reforming processing, to separate contaminants from a product stream. PSA is a purely physical process; there are no chemical, electrical, or other reactions in the processing. The PSA absorber separates contaminants from a product stream, and rejects out of the PSA what is commonly referred to as reject gas or off-gas.

FIG. 1 is a simplified schematic showing a conventional processing arrangement, generally designated by the reference numeral 10, of a non-purified product gas stream 12 in a pressure swing absorber 14 to recover a purified (e.g., 99.99%) hydrogen gas (H2) product stream 16 and to form a PSA off-gas stream 20 such as can be routed to a firebox or otherwise appropriately disposed. Conventional reforming systems utilize PSA off-gas, such as typically having a chemical composition of about 40-80% vol H2, 10-40% methane, 0-20% CO2, with CO, N2 and H2O as minor constituents, for heating value.

There remains a need and demand for systems and methods that result in improved or increased carbon capture during hydrogen generation during such processing.

SUMMARY OF THE INVENTION

The invention adds a recycle loop to a PSA processing system, particularly to a PSA processing system used as a part of or in conjunction with reforming processing, One aspect of the invention is directed to an improvement in a reforming process employing a pressure swing absorber. The pressure swing absorber separates, for example, H2 from a non-purified product gas of the reforming process to provide the PSA off-gas stream. In one embodiment such an improvement involves recycling at least a first portion of a PSA off-gas stream produced by the absorber to a reforming reactor of the reforming process.

A second portion of the PSA off-gas stream can be introduced to a firebox of the reforming process, such as for the regeneration of a sorbent. The firebox heats, for example, a spent sorbent and/or at least one stream (e.g., steam, etc.) for the reforming process. In embodiments of this invention, a portion of a purified H2 product from the pressure swing absorber is introduced to the second portion of the PSA off-gas stream for improving performance as needed, depending on the use and/or type of reforming process.

The recycled PSA off-gas stream may undergo compression processing prior to introduction into the reforming reactor. In embodiments of the invention, the reforming process is a sorbent enhanced reforming process, such as including a fluidized bed reactor. The compressed recycled first portion of the PSA off-gas stream can be heated and introduced with a superheated steam and natural gas feed to the fluidized bed reactor.

In another embodiment, the compressed recycled PSA off-gas stream may undergo H2 separation processing, such as membrane separation processing prior to introduction into the reforming reactor to remove H2.

The invention further includes a method of sorbent enhanced reforming. The method including: introducing superheated steam and a natural gas feed, desirably with a sorbent, to a reforming reactor to produce a H2 rich fluid stream, such as at pressures ranging from 3-25 bar; introducing the H2 rich fluid stream to a pressure swing absorber (PSA) to produce a purified H2 product and a PSA off-gas stream; and recycling at least a first portion of the PSA off-gas stream to the reforming reactor. A second portion of the PSA off-gas stream can be delivered to a firebox of the sorbent enhanced reforming, such as part of a calciner for sorbent regeneration and/or other heating.

The invention further includes a system for sorbent enhanced reforming. The system includes a reforming reactor including a sorbent, and configured to receive a natural gas and produce a H2 rich fluid stream by adsorbing CO2 using the sorbent. A pressure swing absorber (PSA) is configured to receive the H2 rich fluid stream and produce a purified H2 product and a PSA off-gas stream. A recycle line connecting the pressure swing absorber to the reforming reactor is configured to introduce at least a first portion of the PSA off-gas stream to the reforming reactor. The system desirably includes a firebox configured to heat a reactant for the reforming reactor, and a PSA off-gas line connecting the pressure swing absorber to the firebox, and configured to introduce a second portion of the PSA off-gas stream to the firebox.

A compressor can be used in combination with the recycle line and configured to compress the first portion of the PSA off-gas stream before the reforming reactor, such as for a fluidized bed reactor. Embodiments of this invention also include a H2 separation system in combination with the recycle line and configured to remove H2 from the first portion of the PSA off-gas stream before the reforming reactor.

In the case of conventional Steam Methane Reforming (SMR), a CO2 capture system is typically required before the PSA absorber to remove the CO2 from the system. In the case of Sorbent Enhanced Reforming (SER), the CO2 is already captured within the sorbent. A recycle gas compressor can be used to increase the pressure of the off-gas sufficiently for reinjection into the system. This enables a greater portion of carbon to be captured from the system.

DETAILED DESCRIPTION

As detailed below, the present invention desirably incorporates a recycle of at least a portion of PSA off-gas. As a result, the invention can desirably serve to increase carbon capture during or as a part of hydrogen generation.

Figure 1:
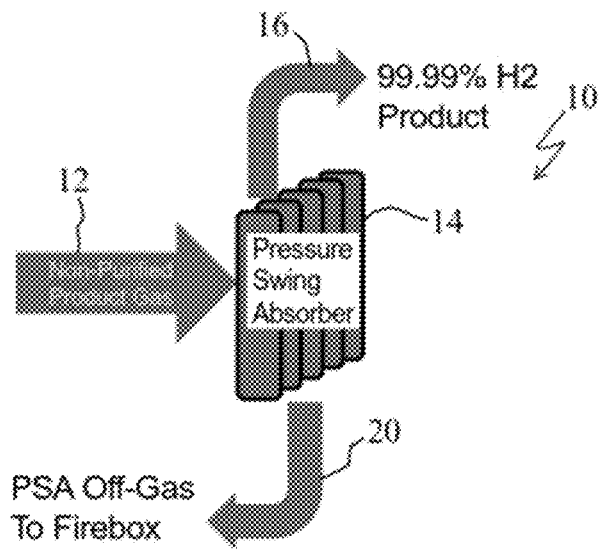
FIG. 1 is a simplified schematic showing conventional processing via a pressure swing absorber.
Figure 2:
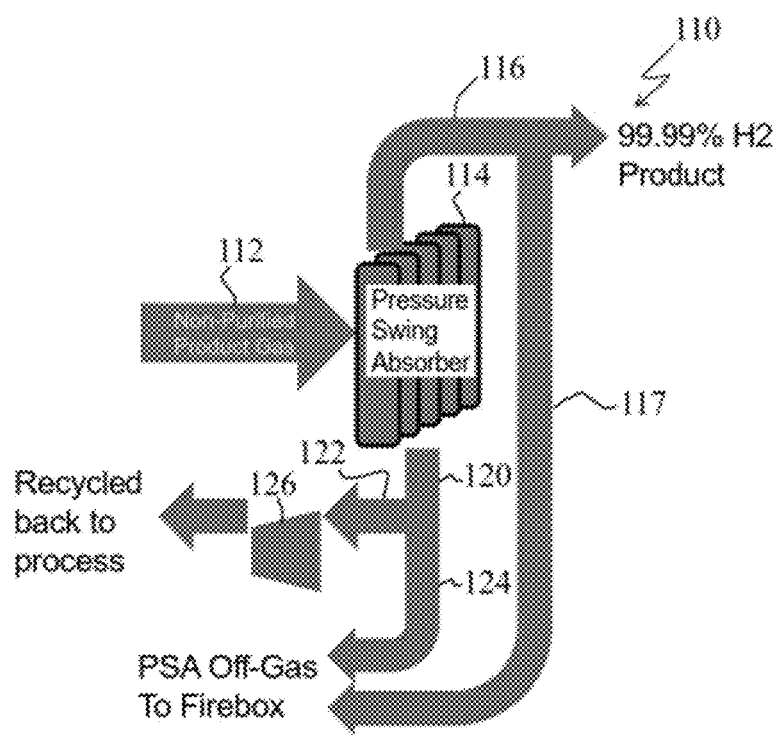
FIG. 2 is a simplified schematic showing modification of conventional PSA processing in accordance with one aspect of the subject invention.

FIG. 2 is a simplified schematic showing a processing arrangement or system, generally designated by the reference numeral 110, in accordance with one embodiment of the subject invention. In the processing system 110, a non-purified product gas stream 112 is introduced into a pressure swing absorber 114 to recover a purified (e.g., 99.99%) hydrogen gas (H2) product stream 116 and to form a PSA off-gas stream 120.

The processing system 110 differs from the process system 10 in that a first portion of the PSA off-gas stream 120 is recycled as a stream 122 while a second portion 124 is routed to a firebox or otherwise appropriately used or disposed. In processing arrangements involving PSA off-gas recycle, such as shown in FIG. 2, a portion of the purified (e.g., 99.99%) hydrogen gas (H2) product stream 117 may also be directed to the firebox, as may be desired. As shown, the recycled PSA off-gas stream 122 can be appropriately processed via a compressor or the like 126 prior to being reintroduced into the processing scheme, as further described below.

Figure 3:
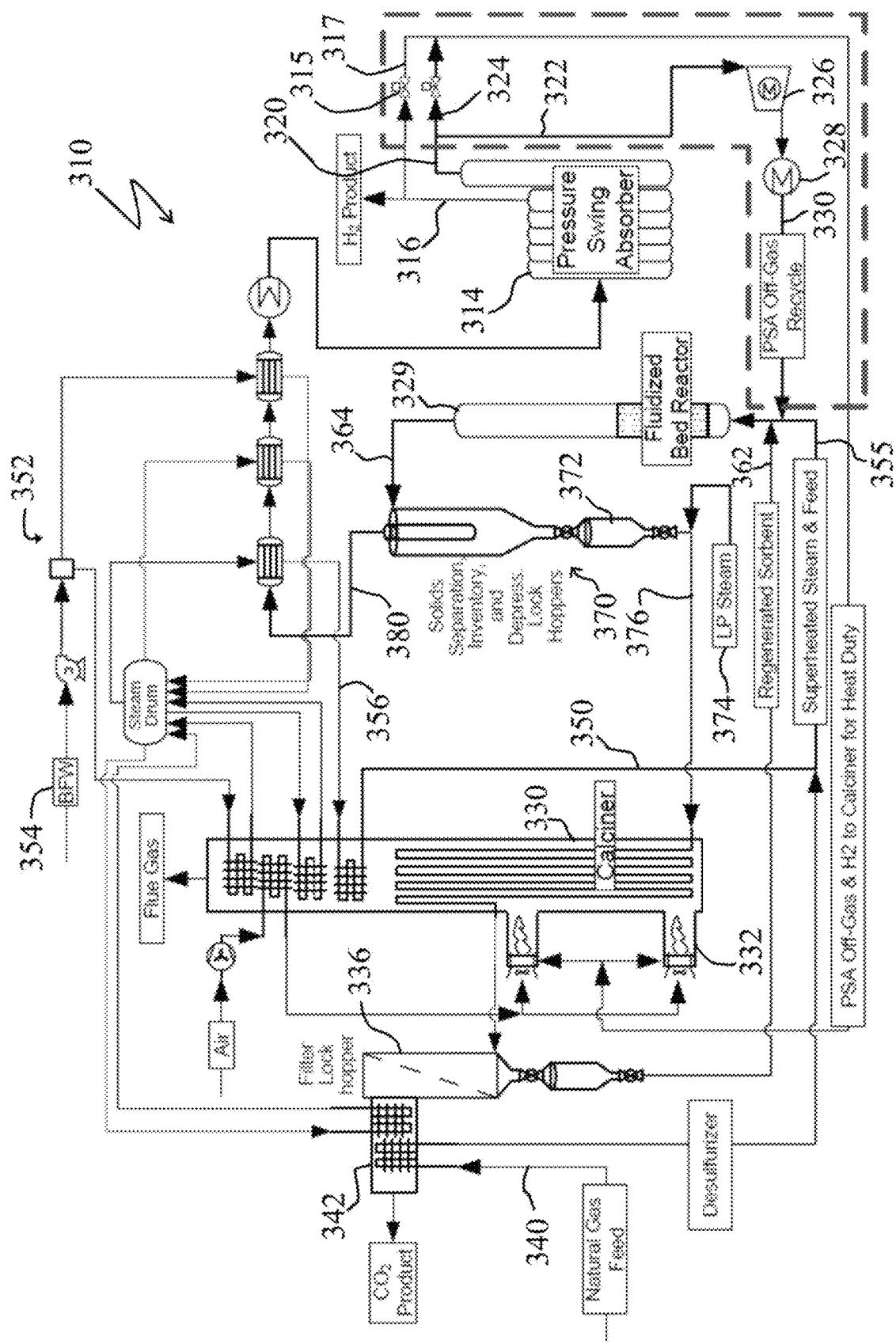
FIG. 3 is a simplified schematic showing modification of conventional PSA processing in accordance with one embodiment of the invention in conjunction with a reforming process.

FIG. 3 shows a reforming system 310, namely a sorbent enhanced steam gas reforming system, for illustrating an embodiment of this invention. The reforming system 310 receives a natural gas feed 340 (e.g., methane) that passes through a CO2 outlet heat exchanger 342. The gas feed 340 is treated as needed, such as using a desulfurizer, and then mixed with superheated steam 350 originating in steam system 352. Steam system 352 uses a boiler water feed 354 to create steam 356 using various heat exchanger and/or other processes generally known in the reforming art, that is then additionally heated through calciner 330 before mixing with the gas feed 340 to provide a steam-methane reforming reaction, such as a pressurized reaction whereby the methane reacts with steam under 3-25 bar pressure in the presence of a catalyst to produce hydrogen, carbon monoxide, and a relatively small amount of carbon dioxide. The carbon monoxide and steam are then reacted using a catalyst to produce carbon dioxide and more hydrogen.

The illustrated reforming system 310 uses a fluidized bed reactor 329 for reaction to produce and separate CO2 from H2 in the reforming reaction. The fluidized bed 329 receives the gas and steam feed 355 and a sorbet 362, and the sorbent removes a portion of the CO2 from the reaction. The fluidized sorbent with reaction products is transferred via line 364 to a solid separation system 370 to separate the sorbent and CO2 from a H2-rich stream 380. The separation system 370 includes a lock hopper 372 for introducing the sorbent to a steam feed 374. The sorbent stream 376 is passed through the calciner 330 and a filter lock hopper 336 to remove the CO2 from the sorbent, which is then returned to the fluidized bed reactor 329.

The reforming system 310 includes a pressure swing absorber 314 to recover a purified hydrogen gas (H2) product stream 316 from the non-purified, H2-rich gas stream 380. The pressure swing absorber 314 further results in a PSA off-gas stream 320 of carbon dioxide and other impurities removed from the H2-rich gas stream 380. In the reforming system 310, a first portion of the PSA off-gas stream 320 is recycled as a stream 322 back to the reforming reactor, namely the fluidized bed reactor 329, while a second portion 324 is routed to the calciner 330 for use as, or otherwise mixed with, combustion air in the firebox 332.

As shown, the recycled PSA off-gas stream 322 can be appropriately processed via a compressor 326 and a heat exchanger 328 to form a PSA off-gas recycle stream 330 such as appropriate for reintroduction into the processing scheme, such by being introducing into the system 310 fluidized bed reactor 329. In one preferred embodiment, the compressed PSA off-gas recycle stream 330 can constitute about 80-90%, 84-88%, or 86% and the stream portion 324 can constitute about 10-20%, 12-16%, or 14%, respectively of the PSA off-gas stream 320.

In embodiments of this invention, as shown in FIG. 3, a portion, shown as stream 317, of the purified (e.g., 99.99%) hydrogen gas (H2) product 316 may also be directed to the calciner 330. The purified H2 portion 317 can be mixed with the PSA off-gas second portion 324 or separately directed. A valve 315 can be used to adjust or stop the purified H2 317, depending on need.

Figure 4:
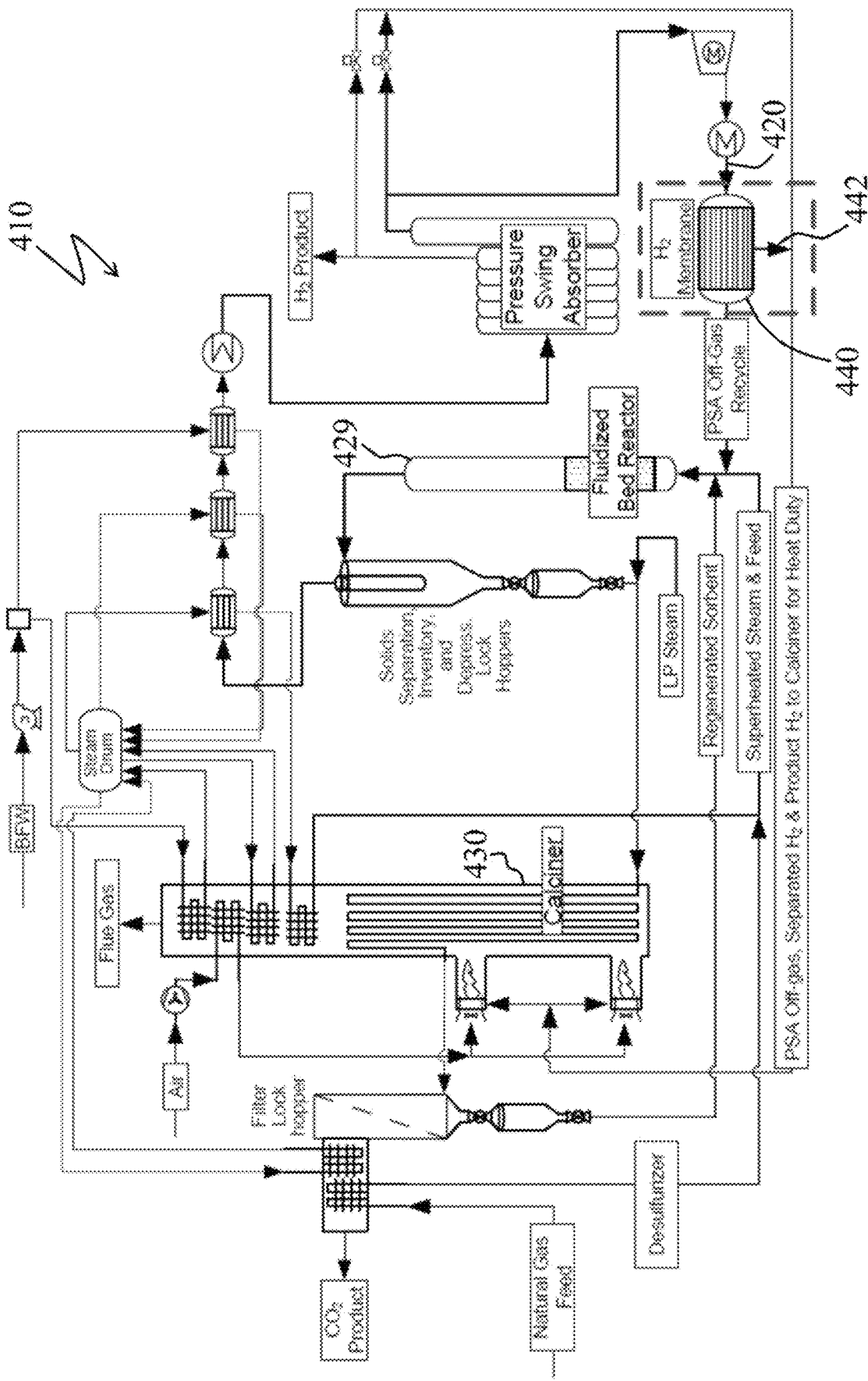
FIG. 4 is similar to FIG. 3 but now showing a processing modification in accordance with another embodiment of the invention.

FIG. 4 shows a reforming system 410 somewhat similar to the reforming system 310 shown in FIG. 3 and described above but now showing a processing modification in accordance with another embodiment of the invention. More specifically, the reforming system 410 includes a H2-separation unit 440, such as in the form of a H2-separation membrane, to remove hydrogen from the PSA off-gas 420 prior to recycle to the fluidized bed reactor 429. The separated H2 may be removed as additional purified H2 or, as shown as stream 442, be added to the PSA off-gas and product H2 fed to the calciner 430.

Those skilled in the art and guided by the teachings herein provided will understand and appreciate that in or for SMR processing, the invention can reduce and/or eliminate the need for carbon capture of the atmospheric firebox. As a result, system complexity and/or steam demand can be significantly reduced.

In addition, the Gas Technology Institute (GTI) has and is developing a Compact Hydrogen Generator (CHG) process, based on SER technology, which successfully integrates previously independent process steps, achieves superior energy efficiency by lowering reaction temperatures, and provides pathways to increasing energy productivity with less environmental pollution. Those skilled in the art and guided by the teachings herein provided will understand and appreciate that appropriate application of the subject invention to GTI's CHG processing, may desirably enable greater carbon capture such as by minimizing the carbon bearing compounds being released to the atmosphere.

The invention illustratively disclosed herein suitably may be practiced in the absence of any element, part, step, component, or ingredient which is not specifically disclosed herein. Although specific advantages have been enumerated above, various embodiments may include some, none, or all of the enumerated advantages.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. In a sorbent enhanced reforming process employing a pressure swing absorber (PSA), an improvement comprising:
   recycling at least a first portion of a PSA off-gas stream produced by the pressure swing absorber to a reforming reactor of the reforming process, wherein the recycled first portion of the PSA off gas stream undergoes H2 separation processing prior to introduction into the reforming reactor.

2. The improvement of claim 1, wherein the pressure swing absorber separates H2 from a non-purified product gas of the sorbent enhanced reforming process to provide the PSA off-gas stream.

3. The improvement of claim 1, wherein a second portion of the PSA off-gas stream is introduced to a firebox of the sorbent enhanced reforming process.

4. The improvement of claim 3, wherein a portion of a purified H2 product from the pressure swing absorber is introduced to the second portion of the PSA off-gas stream.

5. The improvement of claim 3, wherein the firebox heats at least one of a sorbent or a stream for the sorbent enhanced reforming process.

6. The improvement of claim 1, wherein the recycled first portion of the PSA off-gas stream undergoes compression processing prior to introduction into the reforming reactor.

7. The improvement of claim 6, wherein the reforming reactor comprises a fluidized bed reactor.

8. The improvement of claim 7, wherein the compressed recycled first portion of the PSA off-gas stream is heated and introduced with a superheated steam and natural gas feed to the fluidized bed reactor.

9. The improvement of claim 1, wherein the H2 separation comprises membrane separation processing.

10. A method of sorbent enhanced reforming, the method comprising:
   introducing superheated steam and a natural gas feed to a reforming reactor to produce a H2 rich fluid stream;
   introducing the H2 rich fluid stream to a pressure swing absorber (PSA) to produce a purified H2 product and a PSA off-gas stream;
   recycling at least a first portion of the PSA off-gas stream to the reforming reactor; and
   removing H2 from the at least a first portion of the PSA off-gas stream prior to introduction into the reforming reactor.

11. The method of claim 10, further comprising introducing a second portion of the PSA off-gas stream to a firebox of the sorbent enhanced reforming.

12. The method of claim 11, further comprising introducing a portion of the purified H2 product from the pressure swing absorber to the second portion of the PSA off-gas stream.

13. The method of claim 10, further comprising compressing the at least a first portion of the PSA off-gas stream for recycling to the reforming reactor.

14. A system for sorbent enhanced reforming, comprising:
   a reforming reactor including a sorbent, and configured to receive a natural gas and produce a H2 rich fluid stream by adsorbing CO2 using the sorbent;
   a pressure swing absorber (PSA) configured to receive the H2 rich fluid stream and produce a purified H2 product and a PSA off-gas stream;
   a recycle line connecting the pressure swing absorber to the reforming reactor, and configured to introduce at least a first portion of the PSA off-gas stream to the reforming reactor; and
   a H2 separation system in combination with the recycle line and configured to remove H2 from the first portion of the PSA off-gas stream before the reforming reactor.

15. The system of claim 14, further comprising:
   a firebox configured to heat a reactant for the reforming reactor; and
   a PSA off-gas line connecting the pressure swing absorber to the firebox, and configured to introduce a second portion of the PSA off-gas stream to the firebox.

16. The system of claim 14, wherein the reforming reactor comprises a fluidized bed reactor.

17. The system of claim 14, further comprising a compressor in combination with the recycle line and configured to compress the first portion of the PSA off-gas stream before the reforming reactor.

18. In a sorbent enhanced reforming process employing a pressure swing absorber (PSA), an improvement comprising:
   recycling at least a first portion of a PSA off-gas stream produced by the pressure swing absorber to a reforming reactor of the reforming process, wherein a second portion of the PSA off-gas stream is introduced to a firebox of the sorbent enhanced reforming process, and a portion of a purified H2 product from the pressure swing absorber is introduced to the second portion of the PSA off-gas stream.

19. In a sorbent enhanced reforming process employing a pressure swing absorber (PSA), an improvement comprising:
   recycling at least a first portion of a PSA off-gas stream produced by the pressure swing absorber to a reforming reactor of the reforming process, wherein the recycled first portion of the PSA off-gas stream undergoes compression processing prior to introduction into the reforming reactor, the reforming reactor comprises a fluidized bed reactor, and the compressed recycled first portion of the PSA off-gas stream is heated and introduced with a superheated steam and natural gas feed to the fluidized bed reactor.

20. The improvement of claim 19, wherein a second portion of the PSA off-gas stream is introduced to a firebox of the sorbent enhanced reforming process, and a portion of a purified H2 product from the pressure swing absorber is introduced to the second portion of the PSA off-gas stream.

* * * * *